United States Patent
van der Beek

(10) Patent No.: US 9,560,145 B2
(45) Date of Patent: Jan. 31, 2017

(54) XMPP BASED UPNP DEVICE ARCHITECTURE FOR CLOUD COMPUTING IN A NETWORK ENVIRONMENT

(71) Applicant: CISCO TECHNOLOGY, INC., San Jose, CA (US)

(72) Inventor: Wouter Anne van der Beek, Chandlers Ford (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 459 days.

(21) Appl. No.: 14/132,213

(22) Filed: Dec. 18, 2013

(65) Prior Publication Data

US 2015/0026307 A1    Jan. 22, 2015

Related U.S. Application Data

(60) Provisional application No. 61/856,689, filed on Jul. 20, 2013.

(51) Int. Cl.
*G06F 15/16* (2006.01)
*H04L 29/08* (2006.01)
(Continued)

(52) U.S. Cl.
CPC ........... *H04L 67/16* (2013.01); *H04L 12/2812* (2013.01); *H04L 65/608* (2013.01)

(58) Field of Classification Search
CPC .............................. H04L 12/2836; H04L 69/08
(Continued)

(56) References Cited

U.S. PATENT DOCUMENTS

2002/0029256 A1* 3/2002 Zintel ................. H04L 12/2803
                                                      709/218
2004/0255029 A1* 12/2004 Manion ............... H04L 12/2803
                                                      709/227
(Continued)

FOREIGN PATENT DOCUMENTS

WO     WO2015/012983      1/2015

OTHER PUBLICATIONS

PCT Jan. 26, 2016 International Preliminary Report on Patentability and Written Opinion from International Application PCT/US2014/043476.

(Continued)

*Primary Examiner* — Duyen Doan
(74) *Attorney, Agent, or Firm* — Patent Capital Group

(57) ABSTRACT

An example method for Extensible Messaging and Presence Protocol (XMPP) based Universal Plug and Play (UPnP) device architecture for cloud computing in a network environment is provided and includes mapping a first content according to UPnP device architecture protocols to at least one stanza according to Extensible Messaging and Presence Protocol (XMPP), generating data comprising the at least one stanza and a second content formatted according to UPnP device control protocols (DCPs), and transmitting the data in an Extensible Markup Language (XML) stream over an XMPP network from a first UPnP entity in a first UPnP network to a second UPnP entity in a second, remote UPnP network. In specific embodiments, the second content includes vendor specific information conveyed in appropriate device descriptions and service descriptions.

20 Claims, 7 Drawing Sheets

(51) Int. Cl.
   *H04L 12/28* (2006.01)
   *H04L 29/06* (2006.01)
(58) Field of Classification Search
   USPC .................................................. 709/219, 246
   See application file for complete search history.

(56) References Cited

U.S. PATENT DOCUMENTS

| | | | | |
|---|---|---|---|---|
| 2006/0143295 | A1* | 6/2006 | Costa-Requena ... | H04L 63/0428 709/227 |
| 2006/0280166 | A1* | 12/2006 | Morris .................... | H04L 67/32 370/352 |
| 2007/0198669 | A1* | 8/2007 | Convertino ......... | H04L 12/2807 709/220 |
| 2008/0130639 | A1* | 6/2008 | Costa-Requena ......... | G06F 8/65 370/389 |
| 2009/0010184 | A1* | 1/2009 | Luiro .................... | H04W 76/02 370/277 |

OTHER PUBLICATIONS

Hildebrand, Joe, et al., "XEP-0030: Service Discovery" XMPP Standards Foundation (XSF), Denver, Colorado, Jun. 6, 2008, Version 2.4, 27 pages.
Saint-Andre, Peter, "XEP-0045: Multi-User Chat," XMPP Standards Foundation (XSF), Denver, Colorado, Feb. 8, 2012, Version 1.25, 159 pages.
Millard, Peter, et al., "XEP-0060: Publish-Subscribe," XMPP Standards Foundation (XSF), Denver, Colorado, Jul. 12, 2010, Version 1.13, 180 pages.
Saint-Andre, Peter, "XEP-0071: XHTML-IM," XMPP Standards Foundation (XSF), Denver, Colorado, Nov. 28, 2012, Version 1.5, 37 pages.
Forno, Fabio, et al., "XEP-0072: SOAP Over XMPP," XMPP Standards Foundation (XSF), Denver, Colorado, Dec. 14, 2005, Version 1.0, 34 pages.
Saint-Andre, Peter, et al., "XEP-0085: Chat State Notifications," XMPP Standards Foundation (XSF), Denver, Colorado, Sep. 23, 2009, Version 2.1, 17 pages.
Muldowney, Thomas, et al., "XEP-0095: Stream Initiation," XMPP Standards Foundation (XSF), Denver, Colorado, Apr. 13, 2004, Version 1.1, 12 pages.
Muldowney, Thomas, et al., "XEP-0096: SI File Transfer," XMPP Standards Foundation (XSF), Denver, Colorado, Apr. 13, 2004, Version 1.2, 12 pages.
Hildebrand, Joe, et al., "XEP-0115: Entity Capabilities," XMPP Standards Foundation (XSF), Denver, Colorado, Feb. 26, 2008, Version 1.5, 23 pages.
Saint-Andre, Peter, et al., "XEP-0127: Common Alerting Protocol (CAP) Over XMPP," XMPP Standards Foundation (XSF), Denver, Colorado, Dec. 9, 2004, Version 1.0, 9 pages.
Saint-Andre, Peter, et al., "XEP-0248: PubSub Collection Nodes," XMPP Standards Foundation (XSF), Denver, Colorado, Sep. 28, 2010, Version 0.2, 28 pages.
PCT Sep. 17, 2014 International Search Report and Written Opinion of the International Searching Authority from International Application PCT/US2014/043476.
Hornsby, A., et al., "XMPP-based wireless sensor network and its integration into the extended home environment," Consumer Electronics, 2009, ISCE 2009, IEEE 13$^{th}$ International Symposium, May 25, 2009.
Hornsby, A., et al., "XMPP: lighweight implementation for low power operating system Contiki," Ultra Modern Telecommunmiations & Workshops, 2009, ICUMT 2009. International Conference, Oct. 12, 2009.
Information Technology for European Advancement, Innovation Report, "Home-to-Home UPnP Transparent access to remote devices," Mar. 1, 2006, 2 pages; http://www.itea2.org/innovation_reports.
Coherence Project—a DLNA/UpnP Framework for the Digital Living—Trac, "Welcome to Coherence," 4 pages, retrieved and printed Nov. 20, 2013 from http://coherence-project.org.
Fout, Tom, "Universal Plug and Play in Windows XP," published Jul. 1, 2001; updated Aug. 8, 2001, © 2013 Microsoft, 24 pages; http://technet.microsoft.com/en-us/library/bb457049.aspx.
UPnP™ Implementers Corporation, "UPnP™ Technology—The Simple, Seamless Home Network" White Paper, Dec. 1, 2006, 8 pages; http://upnp.org/resources/whitepapers/UPnP %20Technology_The%20Simple,%20Seamless%20Home %20Network_whitepaper.pdf.
UPnP™ Forum, "UPnP™ Device Architecture 1.1," Rev. date Oct. 15, 2008, 136 pages; www.upnp.org.
UPnP Forum$^{SM}$ UPNP® Remote Access—Connecting Two Home or Small Business Networks, Jun. 2012, 18 pages.

* cited by examiner

```
        74

80 ─ <iq from='myaccount@home.com/MediaServer'
        id='rs1'
        type='set'>
     <query xmlns='jabber:iq:roster's>
       <item jid='MyMediaServer@myhome.com'/>
     </query>
     </iq>

82 ─ <presence xml:lang="en">
      <show>dnd</show>
      <status>UPnP-byebye.</status>
     <presence>

84 ─ <presence xml:lang="en">
      <show>dnd</show>
      <status>UPnP-alive.</status>
     <presence>

86 ─ <presence from="'myaccount@myhome.com'" to="someone1@gmail.com" xml:lang="en">
     <show>dnd</show>
     <status> UPnP-byebye.</status>
     </presence>
     <presence from="'myaccount@myhome.com'" to="someone2@gmail.com" xml:lang="en">
     <show>dnd</show>
     <status> UPnP-byebye.</status>
     </presence>
     <presence from="'myaccount@myhome.com'" to="someone3@gmail.com" xml:lang="en">
     <show>dnd</show>
     <status> UPnP-byebye.</status>
      </presence>

88 ─ <iq from='myaccount@myhome.com/MediaServer'
        id='hu2bac18'
        type='get'>
      <query xmlns='jabber:iq:roster'/>
      <upnp_status>ALIVE</upnp_status>
     </iq>

90 ─ <iq to="juliet@gmail.com" type="result" id="roster_1">
     <query xmlns="jabber:iq:roster">
     <item jid="'MyMediaServer@myhome.com'" name="MyMediaServer" subscription="both">
     <group>UPnP MediaServers</group>
     <deviceDescription>
     ... the contents of the UPnP device description
     </deviceDescription>
     </query>
      </iq>
```

92 —
```
<iq to='MyMediaServer@myhome.com'type='set' id='dpRead1'>
<GenaSubscribe version="xx">
HOST:
USER-AGENT: OS/version UPnP/1.1 product/version
CALLBACK: MyControlPoint@myhome.com
ServiceID: MyMediaServer@myhome.com/ContentDirectory
NT: upnp:event
</GENASubscribe>
</iq>
```

94 —
```
<iq to= MyControlPoint@myhome.com 'type='set' id='dpRead1'>
<GenaSubscribeResponse version="xx">
<SID>subscription identifier</SID>
<Service>/ContentDirectory</Service>
<Status> OK</Status>
</ GenaSubscribeResponse >
</iq>
```

96 —
```
<iq to= MyControlPoint@myhome.com 'type='set' id='dpRead1'>
<GenaEvent version="xx">
<SID>subscription identifier</SID>
<Service>/ContentDirectory</Service>
<Status> OK</Status>
<SEQ>1</SEQ>
<e:propertyset
xmlns:e="urn:schemas-upnp-org:event-1-0"> <e:property>
<variableName>new value</variableName>
</e:property>
Other variable names and values (if any) go here.
</e:propertyset>
</ GenaEvent >
</iq>
```

98 —
```
<iq to'MyMediaServer@myhome.com 'type='set' id='dpRead1'>
<GenaEventResponse version="xx">
<SID>subscription identifier</SID>
<Service>/ContentDirectory</Service>
<Status> OK</Status>
</ GenaEventResponse >
</iq>
```

FIG. 7

XMPP BASED UPNP DEVICE ARCHITECTURE FOR CLOUD COMPUTING IN A NETWORK ENVIRONMENT

CROSS-REFERENCE TO RELATED APPLICATION

This application claims the benefit of priority under 35 U.S.C. §119(e) to U.S. Provisional Application Ser. No. 61/856,689, "I-1474: XMPP AS UPNP ARCHITECTURE BASIS FOR CLOUD COMPUTING" filed on Jul. 20, 2013, which is hereby incorporated by reference in its entirety.

TECHNICAL FIELD

This disclosure relates in general to the field of communications and, more particularly, to Extensible Messaging and Presence Protocol (XMPP) based Universal Plug and Play (UPnP) device architecture (UDA) for cloud computing in a network environment.

BACKGROUND

The concept of connected UPnP devices over the Internet cloud is an emerging trend in the communication market. Recent developments in cloud services delivered to applications and implementation of other types of home networks (e.g., utility provider's Smart Grids) are expected to impact the dynamics of the market. In such a context, connectedness everywhere is a technical goal and challenge towards which communication technology is rapidly evolving. However, lack of appropriate interoperable communication protocol mechanisms for cloud service delivery combined with proliferation of advanced UPnP devices and services, can leave many users flipping between myriad applications or being frustrated at lack of support on their platforms.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified block diagram illustrating yet other example details of an embodiment of the communication system;

FIG. 7 is a simplified block diagram illustrating yet other example details of an embodiment of the communication system.

DETAILED DESCRIPTION OF EXAMPLE EMBODIMENTS

Overview

An example method for XMPP based UPnP device architecture for cloud computing in a network environment is provided and includes mapping (e.g., converting, translating, transforming, representing) a first content (e.g., textual, numeric, or symbolic information encoded in digital, or analog form) according to UDA protocols to at least one stanza according to XMPP, generating data comprising a second content according to UPnP device control protocols (DCPs) and the at least one stanza, and transmitting the data over an XMPP network from a first UPnP entity in a first UPnP network (e.g., network wherein UPnP devices are configured to communicate according to UPnP protocols) to a second UPnP entity in a second, remote UPnP network.

Example Embodiments

Figure 1:
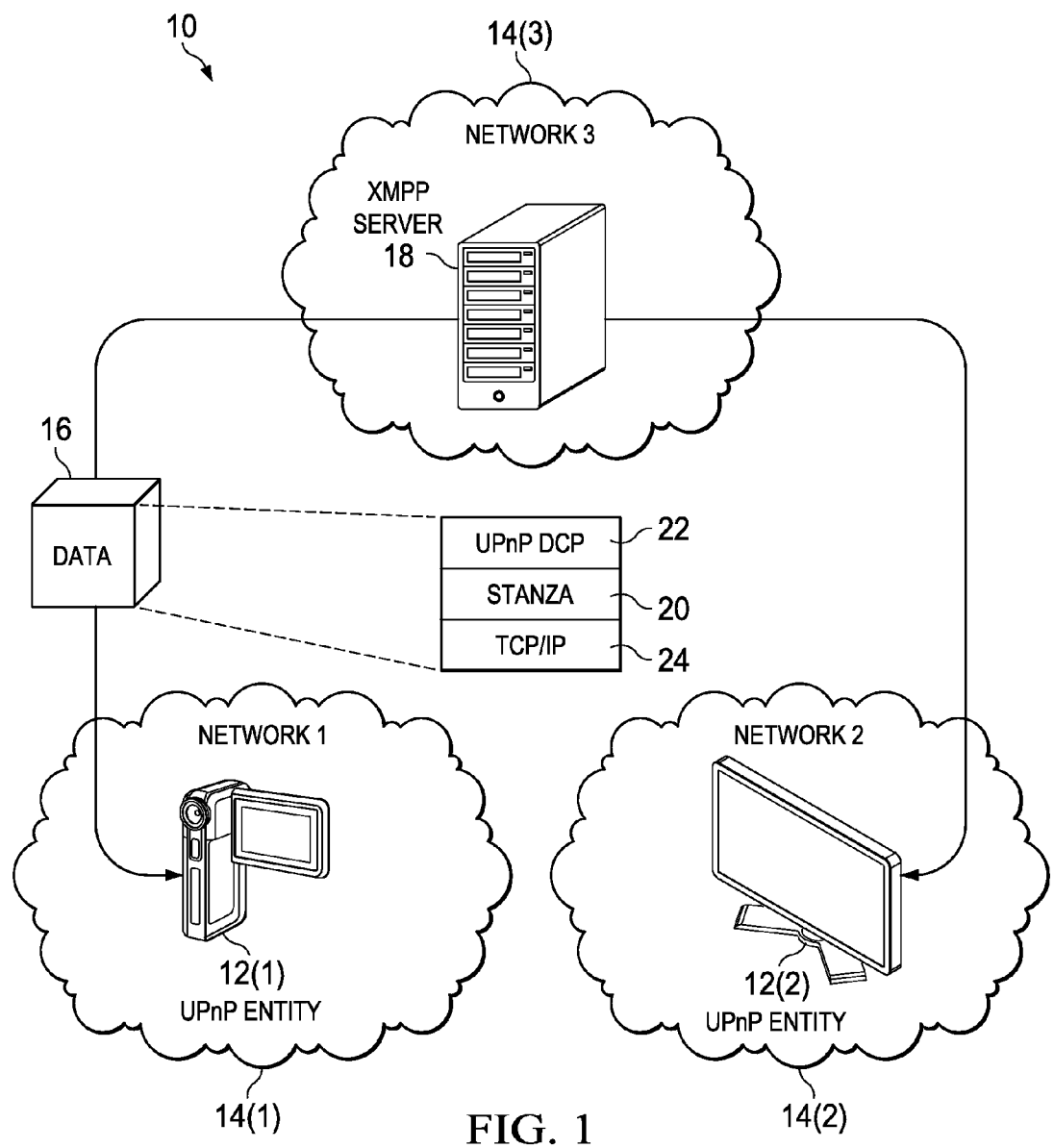
FIG. 1 is a simplified block diagram illustrating a communication system for XMPP based UPnP device architecture for cloud computing in a network environment.

Turning to FIG. 1, FIG. 1 is a simplified block diagram illustrating a communication system 10 for XMPP based UPnP device architecture for cloud computing in a network environment in accordance with one example embodiment. FIG. 1 illustrates a UPnP entity 12(1) in a network 14(1) communicating data 16 with another UPnP entity 12(2) in another remote network 14(2) over an XMPP network 14(3) via an XMPP server 18. In various embodiments, data 16 comprises a stanza 20 wrapping content formatted according to UPnP Device control protocol (DCP) 22 and transmitted using TCP/IP headers 24 (or according to other suitable communication protocol headers).

As used herein, the term "UPnP entity" includes a physical or logical container (e.g., any software or hardware component that can contain other components inside itself) of services. A single UPnP entity, as described in a device description document (DDD), can include multiple services and nested (e.g., embedded) devices. In a general sense, UPnP entities are described in a possible hierarchy of devices (e.g., like a tree structure). Each UPnP entity can provide zero or more services comprising a particular functionality. For example, a video cassette recorder (VCR) UPnP entity may include a tape transport service, a tuner service and a clock service. In another example, a TV/VCR combo UPnP entity can include nested devices comprising the TV and the VCR. The UPnP entity can include a control point (e.g., that communicates with and controls passive devices), or a passive device (e.g., that communicates merely with the control point, and not with other passive devices). For example, UPnP entity 12(2) may comprise a passive device, and UPnP entity 12(1) may comprise a control point.

In a general sense, a UPnP entity can include, by way of examples and not limitations, personal computers, cameras, televisions, printers, Internet Gateways, Wireless-Fidelity access points, mobile devices (such as smartphones, cell phones and laptop computers), and any other network element capable of functioning according to UPnP protocols, as standardized and specified by the UPnP forum, International Standards Organization (ISO), International Electrotechnical Commission (IEC) and other similar standards organizations.

A network element is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

A service indicates the smallest unit of control in the UPnP network. Each service exposes actions (e.g., functions or methods that the service is configured to execute) and models its state with state variables (e.g., properties). For example, a clock service may be modeled with a state variable (e.g., current_time), which specifies the state of the clock, and two actions (e.g., set_time and get_time), which allow control of the service. In addition, some UPnP services may define moderation policies for state variables (e.g., event notifications are not generated for every single change to the underlying state variable, but only if certain conditions are met). For example, event notifications may only be sent if the state variable's value changes for a certain minimum amount. Turning back to the example of the UPnP clock, the clock may event each hour with a moderation time of 1 hour.

The "XMPP network" is any network that can support (e.g., facilitate, permit, allow, aid, assist, etc.) communication according to XMPP protocols (including XMPP Extension Protocols (XEPs)) as standardized and specified by the XMPP Standards Foundation, and Internet Engineering Task Force (IETF) in various Requests for Comments (RFCs) and Internet-Drafts, as provided at http://www.xmpp.org, which are incorporated herein by reference in their entireties.

As used herein, the term "stanza" comprises an atomic level (e.g., basic) semantic unit of structured information (e.g., a small piece of structured data, comprising a fragment of information in Extensible Markup Language (XML)) sent over an XML stream (e.g., a container for exchange of XML elements) between two XMPP entities over a network. The XML stream acts as an envelope for substantially all the stanzas sent during a session. At least three kinds of stanzas are available: message (e.g., providing a push mechanism for generalized messaging), presence (e.g., providing a specialized publish-subscribe mechanism for broadcasting information about network availability), and IQ (short for "Info/Query," providing a request-response mechanism for more structured exchanges of data). Thus, according to XMPP standards, the stanza is a first-level element (e.g., at depth=1 of the XML stream) whose element name is "message", "presence", or "iq" and whose qualifying namespace is 'jabber:client' or 'jabber:server'. Note that the particular values of variables that specify the stanza may change appropriately based on variations to the XMPP standards, and all such variations/changes are included within the broad scope of the embodiments of communication system 10. The stanza typically comprises one or more child elements (with accompanying attributes, elements, and XML character data) as appropriate to convey desired information.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

UPnP™ technology specifies an architecture for peer-to-peer, easy-to-use, flexible, standards-based connectivity to ad-hoc or unmanaged networks of disparate devices, such as home appliances, wireless devices, and computers. UPnP technology provides a distributed, open networking architecture that leverages Transmission Control Protocol/Internet Protocol (TCP/IP), User Datagram Protocol (UDP), and Web technologies (e.g., hyper-text transfer protocol (HTTP), and Extensible Markup Language (XML)) to enable seamless proximity networking and control, discovery and data transfer among the networked devices. Certain communication can be based on wire protocols that are declarative, expressed in XML, and communicated via HTTP.

UPnP technology uses a protocol stack comprising UPnP device control protocols (DCPs) at the highest layer, followed by UPnP forum specifications, which is further followed by UPnP device architecture (UDA) protocols over traditional TCP/IP protocol stacks. At the highest layer, messages logically contain only UPnP vendor-specific information about their devices and corresponding services formatted according to DCPs, which can describe the expected (e.g., standardized) functionality for various devices and services. Moving down the protocol stack, vendor content is supplemented by information defined by UPnP Forum working committees. The messages comprising the content are hosted in various UDA protocols such as the Simple Service Discovery Protocol (SSDP), Service Control Protocol Declaration (SCPD), the General Event Notification Architecture (GENA), and Simple Object Access Protocol (SOAP). SSDP is delivered via UDP multicast messages. SOAP and GENA messages are delivered via HTTP. Ultimately, all messages are delivered over IP.

UDA supports zero-configuration, "invisible" networking, and automatic discovery for a breadth of device categories from a wide range of vendors. Thus, the UPnP entity can dynamically join a UPnP network, obtain an IP address, convey its capabilities, and learn about the presence and capabilities of other UPnP entities on the UPnP network. In addition, the UPnP entity can leave the UPnP network smoothly (e.g., without leaving any unwanted state behind) and automatically (e.g., without manual intervention).

UPnP DCPs specify a standardized schema or template for creating device descriptions and service descriptions. In other words, which types of services are contained in which types of entities is decided by a UPnP Forum working committee and standardized in an applicable DCP, with appropriate vendor extensions. Because different categories of UPnP entities are associated with different sets of services and embedded devices (e.g., services within a VCR are different from those associated with a printer), the standardization for each device type specifies (in general) the particular set of services offered therein (and vice versa). The device descriptions and service descriptions are captured in an XML device description document and XML service description document, respectively, located at the UPnP entity. Similar to the device description, the service description information is part of a standardized XML service description document. A pointer (e.g., Uniform Resource Locator (URL)) to the service description documents is typically contained within the device description document.

Typically, the device description comprises two parts describing functionalities of the UPnP entity: (1) generic information about the entity (e.g., device type (e.g., media server, media renderer, etc.), unique identification number of the entity (e.g., universally unique identifier (UUID)), manufacturer name, and friendly name (e.g., for user interface purposes)); and (2) information about the implemented services and how to use the services (e.g., URL to download the service description document, URL to post the SOAP actions, URL to post the GENA subscribe/unsubscribe messages, etc.). Note that the structure of the device description document and service description document is standardized (e.g., in XML format according to SCPD); however, the contents are domain specific. Thus, the action definitions and state variable definitions are located in the appropriate domain specific DCPs.

The vendor fills in the relevant device description and service description templates with information specific to the UPnP entity comprising a particular device or service, such as the device name, model number, manufacturer name, and URL to the appropriate service description document. The data is encapsulated in UPnP specific protocols according to the UDA (e.g., XML device description template). The UPnP specific information is inserted into all messages before they are formatted using SSDP, GENA, and SOAP and delivered via HTTP and other such protocols.

During operation according to UDA specifications, after the UPnP entity has obtained an address (e.g., IP address) on the UPnP network, discovery operations are performed. SSDP specifies the manner in which services may be discovered on the UPnP network. When a control point (e.g., UPnP entity with controller functionalities capable of discovering and controlling devices on the UPnP network) is added to the UPnP network, SSDP allows the control point to search for UPnP entities of interest on the UPnP network. Typically, the control point sends a SSDP search request to discover UPnP entities (e.g., comprising UPnP devices and services) available on the UPnP network. UPnP entities listen to a multicast port for the search request. Upon receiving the search request, the UPnP entity examines the search criteria to determine a match. If the match is found, a unicast SSDP response is sent to the control point.

In addition, when the UPnP entity is added to the network, SSDP allows the newly added UPnP entity to advertise its services to UPnP control points on the network. The UPnP entity, upon being plugged into the network sends out multiple SSDP presence announcements advertising the services it supports. Both presence announcements and unicast device response messages contain a pointer (e.g., URL) to the location of the device description document (which can include another pointer to the service description document). SSDP also provides for the UPnP entity (including the associated device(s) and service(s)) to gracefully leave the network (e.g., with a SSDP bye-bye notification).

In general, four kinds of SSDP messages are available: (1) Alive Message indicating that the UPnP entity is active on the network; (2) Byebye Message indicating that the UPnP entity is leaving the network; (3) M-Search message, using which the UPnP control point can query the network for existence of certain types of devices; and (4) M-Search response, wherein the UPnP entity responds to the control point query. Typically, each SSDP message includes a message type, the UUID, a location (e.g., URL) of the device description document, a device type information, and an alive time (e.g. during the alive time, the UPnP entity resends the message, and if the message is not resent during the alive time, the control points assumes that the entity has left the network).

After the UPnP control point retrieves the device description document, the UPnP control point control the corresponding UPnP entity using SOAP. SOAP specifies protocols and formats for executing remote procedure calls (e.g., for control purposes) using XML and HTTP. UPnP uses SOAP to deliver control messages to UPnP entities and return results or errors back to UPnP control points. Each UPnP control request is a SOAP message that contains the action to invoke along with a set of applicable parameters (e.g., variables and corresponding data value, event characteristics, etc.). The response is a SOAP message comprising the status, return value and any return parameters.

Each service can publish updates to changes in variables corresponding to services listed in the applicable service descriptions through event messages expressed in XML and formatted using GENA. In one example, the UPnP control point interested in receiving event notifications can subscribe to an event source (e.g., UPnP device or service) by sending a GENA request (e.g., SUBSCRIBE message) that includes the service of interest, a location to send the events to (e.g., its own HTTP server location (e.g., address/port)) and a subscription time for the event notification (e.g., alive time, during which the UPnP control point refreshes the subscription). The UPnP control point can also send a UNSUBSCRIBE command to unsubscribe from the event source. A response to the subscription request typically includes the subscription identifier (SID) and an alive time determined by the UPnP entity. When a state change occurs on the UPnP entity, it signals the change as an event to interested subscribers. The event is expressed as an XML document including the state variables and payload of the state variables. The metadata around the XML document includes the SID and a sequence number.

In a general sense, UPnP technology is limited to local home networks. Thus, connectivity between two disparate UPnP networks is difficult. Certain mechanisms exist to permit remote access to UPnP entities. For example, UPnP remote access mechanism specifies a secure tunnel to communicate between two remote UPnP devices. For example, an away device such as a phone can connect to a home network over an established virtual private network (VPN) tunnel to see the devices in the home network. In such scenarios, the discovery messages are completely different from UDA specifications—the original SSDP messages, to indicate that the devices exist on the network, are recreated on each end of the VPN. In home to home (H2H) connections, constraints on IP address on both sides of the VPN are manually added to achieve connectivity between two UPnP networks. However, such mechanisms do not scale, for example in a large cloud computing application with myriad disparate UPnP entities on separate networks.

XMPP has been used to extend UPnP connectivity across networks in audio/video (A/V) applications. XMPP is a communications protocol for message-oriented middleware based on XML. In particular, XMPP facilitates discovery of services (e.g., XEP-0030) residing locally or across a network, and availability of the services (e.g., via presence). XMPP operates through XML streams comprising one or more stanzas over a network between two (or more) entities. XMPP is typically implemented using a distributed client-server architecture, wherein a client connects to a server to gain access to the network to exchange stanzas with other entities (which can be associated with other servers). The process whereby a client connects to a server, exchanges stanzas, and ends the connection includes the following operations: (1) determine the IP address and port at which to connect; (2) open a TCP connection; (3) open an XML stream over TCP; (4) bind a resource to the stream; (5) exchange an unbounded number of stanzas with other entities on the network; (6) close the XML stream; and (7) close the TCP connection. In addition, within XMPP, one server can optionally connect to another server to enable inter-domain or inter-server communication.

However, the XMPP mechanism to expand UPnP connectivity across networks operates at the application level and works successfully only for a specific DCP, namely the AV DCP. Accordingly, a UPnP media server (called Coherence), specified according to UPnP AV DCP, exports local files or online media to UPnP clients. An application level proxy called Mirabeau allows sharing the UPnP content between two or more local networks over the Internet using XMPP as a transport. Using telepathy tubes (e.g., connections that provide contact-to-contact networking using either network sockets or a private D-bus), Coherence connects to a XMPP (e.g., jabber) account, joins a chat room and starts offering data to other participants of the chat room who are listed in an XMPP roster. While participants join the chat room, the local Coherence instance starts connecting to the tubes available in the chat room and translates them to local UPnP entities. Thus, the mechanism modifies the DCPs and underlying UDA to the extent that they are not used in the addressing, discovery, control, and eventing functions as specified in the UPnP standards. Moreover, the mechanism apparently translates UPnP AV DCPs over XMPP, without any change to underlying protocols in the UPnP protocol stack.

Communication system 10 is configured to address these issues (and others) in offering a system and method for XMPP based UDA for cloud computing in a network environment. According to embodiments of communication system 10, UPnP entities 12(1) and 12(2) may map a first content according to UDA protocols to at least one stanza 20, generate data 16 comprising a second content according to UPnP DCPs 22 and stanza 20, and transmit data 16 to UPnP entities 12(2) and 12(1), respectively, over XMPP network 14(3). Note that data 16 generated at each UPnP entity 12(1) and 12(2) may include different content. For example, data sent from UPnP entity 12(1) to UPnP entity 12(2) may include event information; data sent in the reverse direction from UPnP entity 12(2) to 12(1) may indicate a corresponding response. In specific embodiments of communication system 10, discovery, description, control and eventing according to appropriate UDA protocols may be translated into communication using stanzas 20 according to XMPP at each UPnP entity 12(1) and 12(2).

During operation, UPnP entities 12(1) and 12(2) may log onto XMPP network 14(3), thereby announcing the presence of respective XMPP clients on XMPP network 14(3). In some embodiments, each XMPP client may represent a single UPnP device description, which may comprise one or more UPnP entities (e.g., UPnP devices). In other embodiments, each XMPP client may represent a plurality of device descriptions, which can indicate (but not necessarily) a single physical box (e.g., TV with DVD player capability) with multiple devices and services therein not be specified with any particularity. In various embodiments, UPnP entities 12(1) and 12(2) may send a roster stanza (e.g., <iq/> stanza comprising a new roster item to be added to a roster set) to XMPP server 18 adding the respective UPnP entities to a specific UPnP group. XMPP server 18 may process the roster stanza and proceed according to standard XMPP for adding the roster item. The UPnP group roster may indicate a list of substantially all UPnP entities available for communication with appropriate UPnP control points in networks 14(1) and 14(2).

In various embodiments, discovery operations of the UDA protocols may be translated into XMPP. Thus, UPnP entities 12(1) and 12(2) may communicate discovery information according to SSDP in a <presence/> stanza according to XMPP. In various embodiments, existing presence type messages according to XMPP may be mapped to SSDP announcements; in other embodiments, new presence states may be added. Signaling of being alive or away can be indicated in the <presence/> stanza (e.g., information to signal "away" or "available" of the <presence/> stanza can be mapped directly to UPnP presence indications, such as "UPnP-byebye" or "UPnP-alive" respectively) and sent to XMPP server 18. XMPP server 18 may maintain the presence information (e.g., status of being available or not) in the applicable UPnP group roster.

In addition, a UPnP-byebye SSDP advertisement (e.g., ssdp:byebye) may be mapped to a <presence/> stanza and sent to XMPP server 18. Substantially all subscribed UPnP/XMPP clients can get <presence/> stanza updates from XMPP server 18. In various embodiments, UPnP control points in networks 14(1) and 14(2) can query XMPP network 14(3) to detect entities on the applicable UPnP group that are alive. In embodiments that use the roster mechanism, the UPnP control point may retrieve the specified roster from XMPP server 18 and determine if the presence status of being alive is set therein for each listed UPnP entity. Thus, at least SSDP alive, byebye and update may be mapped to XMPP <presence/> stanzas according to various embodiments of communication system 10.

The discovery information can include UPnP device descriptions and service descriptions, which, according to UDA, may be provided in corresponding documents. In various embodiments, the discovery information comprising UPnP device descriptions and service description may be referenced in (e.g., coupled to, included in, linked in/to, or otherwise embedded in) a roster stanza according to XMPP. In some embodiments, the whole document may be conveyed as an extra parameter in the roster stanza during mapping to XMPP. For example, the device descriptions and service descriptions in HTML format according to UDA may be embedded in the roster stanza according to XEP-0071. In other embodiments, the roster stanza (or other stanza, such as stream initialization stanza) can indicate sufficient information to download the device descriptions and service descriptions documents from a location specified by a particular URL (e.g., using XEP-0095, a requestor such as a UPnP entity or XMPP server can download files (stream) from the location). In yet other embodiments, stanza file transfer mechanism (e.g., according to XEP-0096) can be used to download the device descriptions and service descriptions. Thus, device and service descriptions according to DDD and SCPD (and other protocols/formats) may be mapped to XMPP capability exchange in a <iq/> request/response communication (e.g., according to XEP-0030, XEP-0127, and/or XEP-0115).

After discovery is complete, UPnP entities 12(1) and 12(2) may exchange control information according to UDA specifications, which are mapped to XMPP. The control information may be exchanged among each other, with another UPnP control point, or to process actions on the UPnP entity itself. The control information comprises actions specified in corresponding service descriptions of UPnP entities 12(1) and 12(2). In some embodiments, the actions may be posted to a URL specified in the service descriptions in a format according to SOAP. Embodiments of communication system 10 may translate the actions in SOAP format to a SOAP stanza, for example, according to XEP-0072. Thus, substantially all actions as described in the service descriptions, which also includes corresponding arguments and types, may be reused in the XMPP domain. XML formatting as described in the SOAP request and response documents of the UDA specifications may be retained in the SOAP stanza, with additional XML wrapping as appropriate (e.g., to convey service and device information including destination and receiving information). In some embodiments, each action according to SOAP may be replaced by at least a first XMPP notification and a second XMPP notification, where the first XMPP notification invokes the action and the second XMPP notification relays a response back to the sender.

Event notification based on UDA specifications between UPnP entities 12(1) and 12(1) and with any UPnP control points may be performed according to GENA, which may be reused in the XMPP domain with appropriate modifications (e.g., according to XEP-0060, XEP-0248). In various embodiments, subscribing of control points to event data can be mapped to appropriate <iq/> stanzas with payload to register. For example, the UPnP specific subscribe message may be mapped to a corresponding <iq/> stanza that subscribes the XMPP client to receive event data. In some embodiments, XMPP server 18 (or other suitable network element) may retain substantially all information of the subscribed XMPP clients. Thus, when an event occurs, XMPP server 18 (or other suitable network element) can access the information to send the event data to the subscribed XMPP clients. A similar <iq/> stanza can be used to unsubscribe each XMPP client.

In some embodiments, each GENA subscription message can be replaced by at least two notifications, one to invoke the subscription and another back to the sender to relay the response if the subscription is successful. In some embodiments, new <iq/> stanzas may include registering for events, and delivery of XML state variable documents to subscribed XMPP clients. Events can be published to subscribed XMPP clients through appropriate <iq/> stanzas, and receivers may communicate a response to the event to acknowledge reception in another <iq/> stanza. The XML formatting for the GENA event documents according to UDA specifications can be reused in the <iq/> stanza, with additional XML wrapping around the GENA event documents, as appropriate (e.g., to convey service and device information of the event source). In an example embodiment, the original payload of the UPnP subscribe message may be reused in the <iq/> stanza, with appropriate modifications, such as reformatting HTTP headers according to GENA protocol into XML according to XMPP. In another example embodiment, the original payload of the UPnP subscribe message may be used in the <iq/> stanza, with content formatted as HTTP headers.

In some embodiments, the subscribe message from a specific XMPP client may add the XMPP client to a group chat room, for example, according to XEP-0045. Thus, substantially every XMPP client in the chat room can get the same event data when communicating in the chat room. The event data can be formatted as a chat message, for example, according to XEP-0085. In some embodiments, the XMPP communication may be provided as a multiuser chat room experience, for example, with user defined private rooms, and well known public locations. Local network communication may be using traditional UPnP, whereas communication between remote networks may occur through the multiuser chat rooms. In some embodiments, social media, such as Facebook™ chat and other such chat rooms may also be leveraged for communication between UPnP entities in remote networks.

Embodiments of communication system 10 may replace UDA technologies, including discovery, description, control and eventing by XMPP, for example, so that UPnP DCPs can be reused in the XMPP domain. Embodiments of communication system 10 can leverage existing DCPs (without modification); hence the DCP information is then part of the XMPP notifications. Embodiments of communication system 10 may be easy to upgrade to a cloud interface with existing programming resources. The mechanisms described herein may provide a secure, unicast, extensible communication technology for UPnP connectivity across wide area networks.

Turning to the infrastructure of communication system 10, the network topology of networks 14(1)-14(3) can include any number of XMPP servers, UPnP entities, hardware accelerators, virtual machines, switches and routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in networks 14(1)-14(3).

The example network environment may be configured over a physical infrastructure that may include one or more networks and, further, may be configured in any form including, but not limited to, local area networks (LANs) (e.g., networks 14(1) and 14(2)), wireless local area networks (WLANs), VLANs, metropolitan area networks (MANs), wide area networks (WANs) (e.g., network 14(3)), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, power-line, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

XMPP server 18 functions as an intelligent abstraction layer for XMPP communication, managing connections from or sessions for other XMPP entities (e.g., network elements capable of understanding and interpreting XMPP protocols), and routing appropriately data among such entities over XMPP network 14(3). In various embodiments, XMPP server 18 may comprise, or be located in, or execute on, a rack server, blade server, or other suitable network elements. Moreover, communication system 10 may comprise other XMPP servers and UPnP entities that are not illustrated herein for the sake of simplicity.

Figure 2:
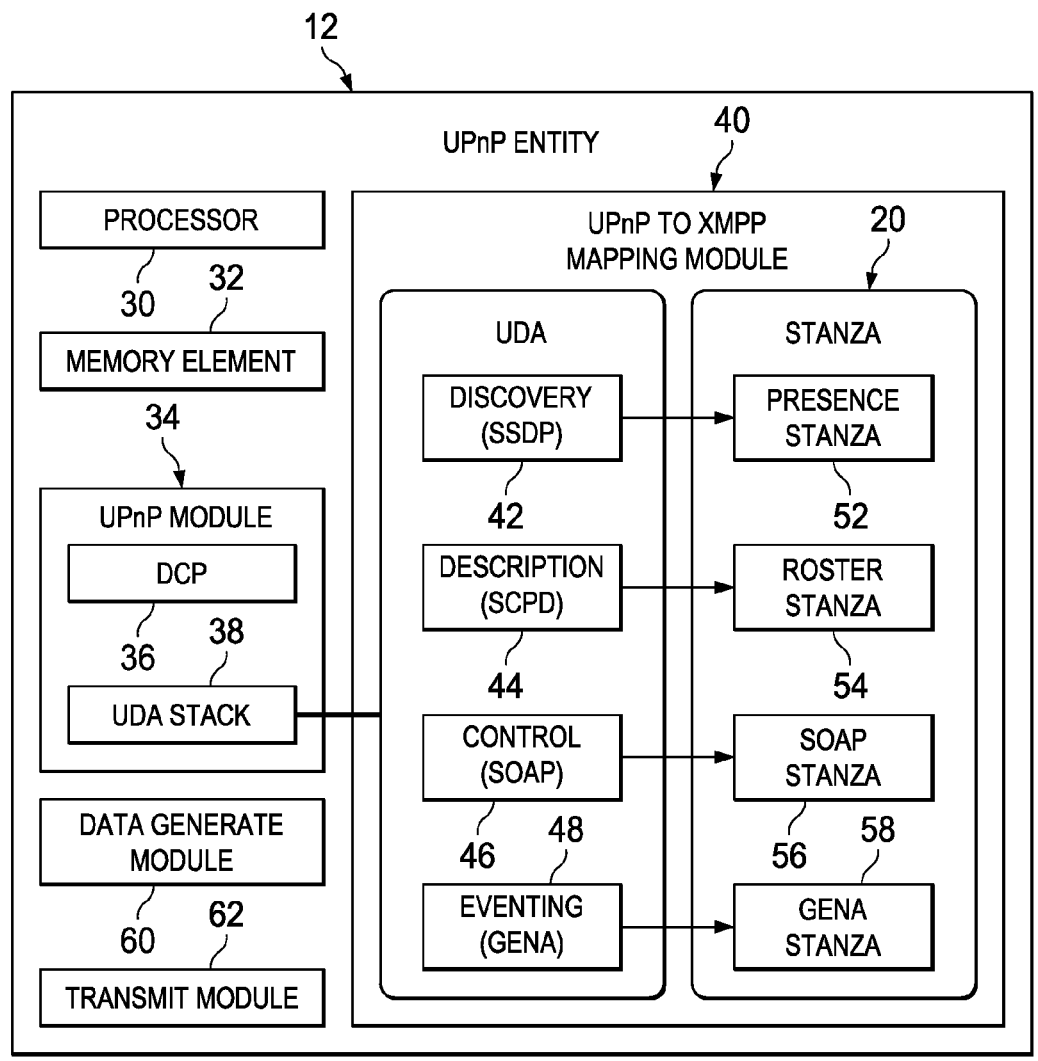
FIG. 2 is a simplified block diagram illustrating example details of an embodiment of the communication system.

Turning to FIG. 2, FIG. 2 is a simplified block diagram illustrating example details of an embodiment of communication system 10. Example UPnP entity 12 includes a processor 30 and a memory element 32. A UPnP module 34 includes content 36 formatted according to DCP and content 38 formatted according to a UDA stack. A UPnP to XMPP mapping module 40 may map a portion of content 38 formatted according to the UDA stack to one or more stanza 20. In an example embodiment, discovery information 42 (according to SSDP), description information 44 (according to DDD and Service Control Protocol Description (SCPD)), control information 46 (according to SOAP), and eventing information 48 (according to GENA) may be mapped to a presence stanza 52, a roster stanza 54, a SOAP stanza 56, and a GENA stanza 58, respectively. A data generate module may generate data 16 comprising content 36 formatted according to DCP, and one or more stanza 20. A transmit module 62 may transmit data 16 from example UPnP entity 12 to another UPnP entity 12 over XMPP network (e.g., 14(3)) in an XML stream. Processor 30 and memory element 32 may facilitate the operations described herein.

Note that embodiments of communication system 10 may use, or reuse various XEPs, with or without suitable modifications, to map content 38 according to UDA to one or more stanzas 20 according to XMPP. The specifications of all such XEPs as published by the XMPP Standards Foundation at www.xmpp.org/extensions are incorporated herein by reference in their entireties. Merely as examples, and not as limitations, an inexhaustive list of such XEPs includes: XEP-0030 (service discovery), XEP-0045 (multi-user chat), XEP-0060 (publish-subscribe), XEP-0071 (XHTML-1.0 Integration), XEP-0072 (SOAP over XMPP), XEP-0085 (chat state notifications), XEP-0095 (stream initiation), XEP-0096 (Stream Initiation File Transfer), XEP-0115 (entity capabilities), XEP-0127 (Common Alerting Protocol over XMPP), and XEP-0248 (PubSub Collection Nodes).

Figure 3:
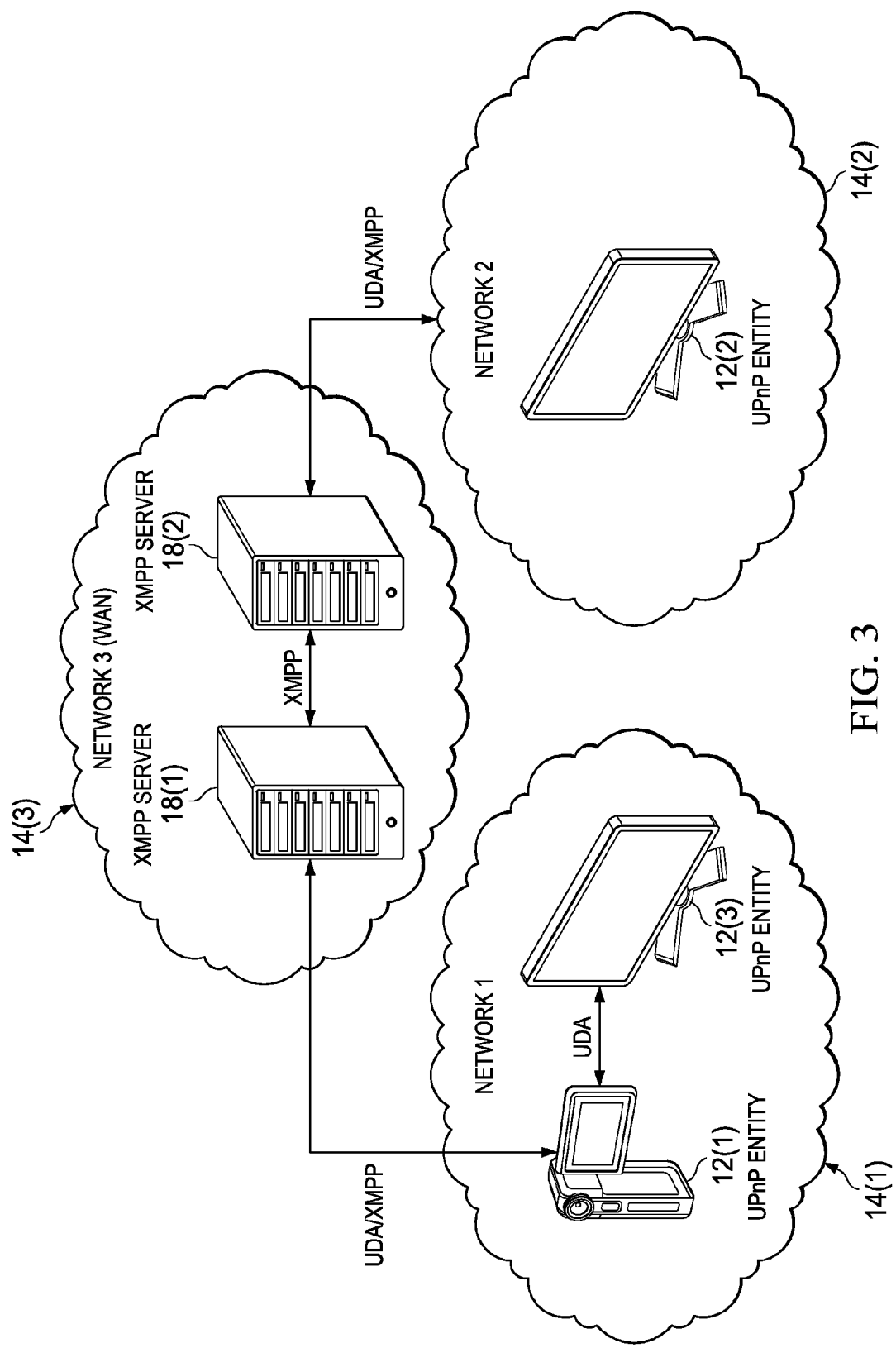
FIG. 3 is a simplified block diagram illustrating yet other example details of an embodiment of the communication system.

Turning to FIG. 3, FIG. 3 is a simplified block diagram illustrating yet other example details of an embodiment of communication system 10. UPnP entity 12(1) in UPnP network 14(1) communicates with another UPnP entity 12(2) in another remote UPnP network 14(2) over XMPP network 14(3) via XMPP servers 18(1) and 18(2). In various embodiments, XMPP network 14(3) may comprise a WAN (e.g., Internet); UPnP networks 14(1) and 14(2) may comprise disparate home (or business) networks (e.g., LANs) located at different geographic locations, and remote from each other. In various embodiments, communication from UPnP entities 12(1) and 12(2) to respective XMPP servers 18(1) and 18(2) may be according to UDA mapped to XMPP; XMPP server 18(1) may according to XMPP protocols with XMPP server 18(2).

In addition, UPnP entity 12(1) may communicate according to UDA (without mapping to XMPP) with yet another UPnP entity 12(3) in UPnP network 14(1). For example, UPnP entity 12(1) may function as a UPnP control point in networks 14(1) and 14(2). Within UPnP network 14(1), UPnP entity 12(1) may communicate using tradition UDA (e.g., without mapping to XMPP); whereas UPnP entity 12(1) may communicate using UDA/XMPP (e.g., content according to UDA mapped to XMPP) with remote network 14(2).

Figure 4:
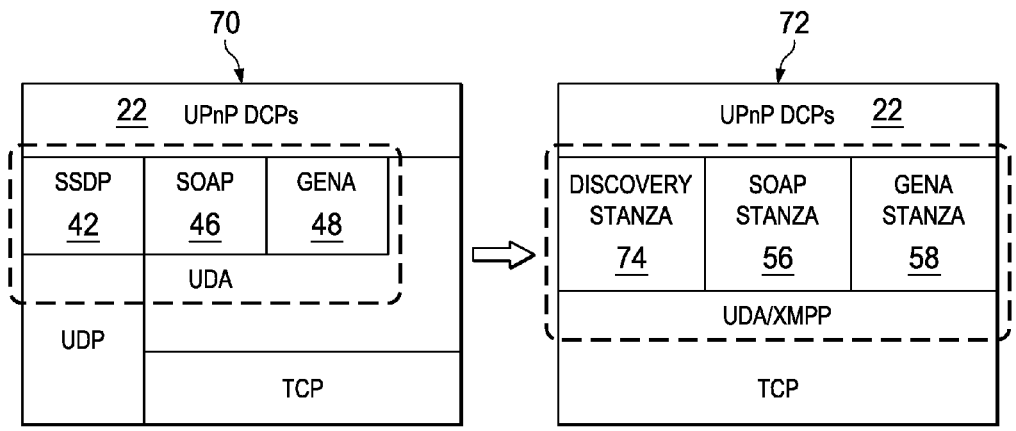
FIG. 4 is a simplified block diagram illustrating yet other example details of an embodiment of the communication system.

Turning to FIG. 4, FIG. 4 is a simplified block diagram illustrating yet other example details of an embodiment of communication system 10. Protocol stack 70 indicates a simplified view of a traditional UPnP protocol stack, including UPnP DCPs 22, SSDP 42, SOAP 46 and GENA 48. UPnP to XMPP mapping module 40 may map protocol stack 70 to XMPP stack 72, comprising the same (e.g., reused) UPnP DCPs 22, a discovery stanza 74 (e.g., comprising presence stanza 52 and roster stanza 54), SOAP stanza 56 and GENA stanza 58.

Figure 5:
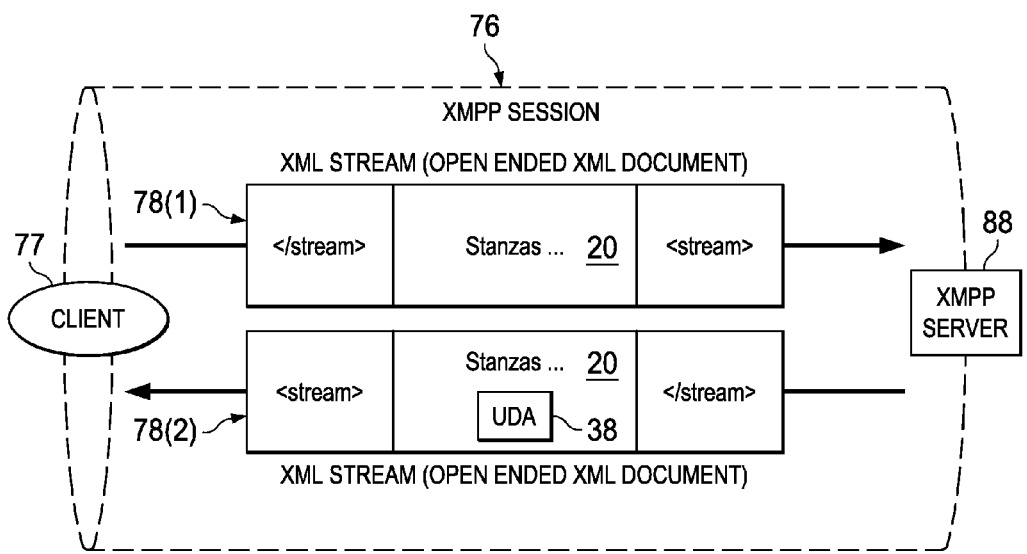
FIG. 5 is a simplified block diagram illustrating yet other example details of an embodiment of the communication system.

Turning to FIG. 5, FIG. 5 is a simplified block diagram illustrating yet other example details of an embodiment of communication system 10. An XMPP session 76 may be established between an XMPP client 77 (e.g., UPnP entity 12) and XMPP server 18. XML streams 78(1) and 78(2) may carry appropriate stanzas 20, which map content 38 formatted according to UDA to formats according to XMPP. By way of examples, and not limitations, stanzas 20 may include discovery stanza 74 (including presence stanza 52 and roster stanza 54), SOAP stanza 56, and GENA stanza 58.

According to XMPP standards, the start of each XML stream 78(1) and 78(2) is denoted unambiguously by an opening XML <stream> tag (with appropriate attributes and namespace declarations), and the end of each XML stream 78(1) and 78(2) is denoted unambiguously by a closing XML </stream> tag. During the life of each XML stream 78(1) and 78(2), the entity that initiated the respective XML stream can send an unbounded number of XML elements (e.g., stanzas 20 and other elements used to negotiate the respective XML stream) over each XML stream 78(1) and 78(2). An "initial stream" is negotiated from the initiating entity (usually either XMPP client 77 or another XMPP server) to the receiving entity (usually XMPP server 18), and can be seen as corresponding to the initiating entity's XMPP session 76 with the receiving entity. The initial stream enables unidirectional communication from the initiating entity to the receiving entity; to enable information exchange from the receiving entity to the initiating entity, the receiving entity negotiates a response stream in the opposite direction.

Each XML stream 78(1) and 78(2) may include various attributes, such as 'to' (e.g., hostname serviced by the receiving entity), 'from' (e.g., hostname serviced by the receiving entity that is granting access to the initiating entity), 'id' (e.g., unique identifier created by the receiving entity to function as a session key for the initiating entity's streams with the receiving entity), 'xml:lang' (e.g., default language of any human-readable XML character data it sends over that stream), and 'version' (e.g., signaling the specific XMPP version supported).

Turning to FIG. 6, FIG. 6 is a simplified block diagram illustrating example discovery stanzas 74 according to an embodiment of communication system 10. Stanza 80 represents an example of roster stanza 54, providing an item (e.g., MyMediaServer) having XMPP JID 'MyMediaServer@myhome.com' to the roster for the UPnP group (e.g., myaccount) at resource MediaServer having JID 'myaccount@myhome.com/MediaServer'. Stanza 82 represents an example of presence stanza 54, setting the status of a UPnP entity to "alive." Stanza 84 represents an example of another presence stanza 54, indicating that the UPnP entity is leaving the network. Stanza 86 represents an example of presence stanza 54 sending an update to three subscribed clients over the XMPP network that the UPnP entity has left the network. Stanza 88 represents an example to query the roster in XMPP server 18 for all active (e.g., alive) UPnP entities on the roster. Stanza 90 represents an example of roster stanza 56 (or other suitable <iq/> stanza) embedding the device description document within the stanza.

Turning to FIG. 7, FIG. 7 is a simplified block diagram illustrating example GENA stanzas 58 according to an embodiment of communication system 10. Stanza 92 represents an example dedicated XMPP <iq/> subscription message, wherein the original payload of the UPnP subscribe message is used (e.g., content is formatted as HTTP headers). Stanza 94 represents an example response to a successful subscription, wherein the original payload of the UPnP subscribe message is used in an XML way (e.g., HTTP headers are reformatted as XML). Stanza 96 represents an example message indicating an event, wherein the message comprises information with appropriate service identification and sent to the subscribed client, wherein the XML formatting of the event property set is kept identical as the UPnP Forum specification. Stanza 98 represents an example response to the event notification message (e.g., to acknowledge reception).

Figure 8:
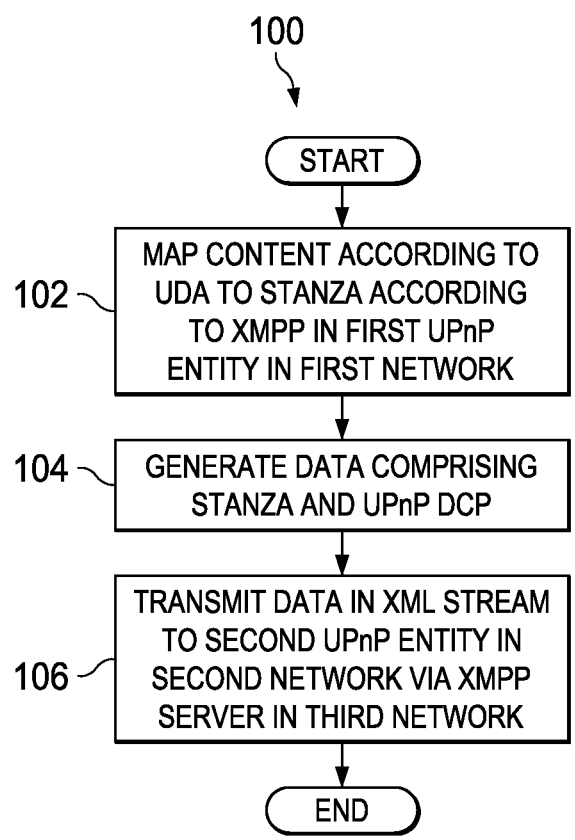
FIG. 8 is a simplified flow diagram illustrating example operations that may be associated with an embodiment of the communication system.

Turning to FIG. 8, FIG. 8 is a simplified flow diagram illustrating example operations 100 that may be associated with an embodiment of communication system 10. At 102, content 38 according to UDA may be mapped to stanza 20 according to XMPP in a first UPnP entity 12(1) in a first UPnP network 14(1). In some embodiments, discovery information 42 (according to SSDP), description information 44 (according to DDD and SCPD), control information 46 (according to SOAP), and eventing information 48 (according to GENA) may be mapped to presence stanza 52, roster stanza 54, SOAP stanza 56, and GENA stanza 58, respectively. At 104, data 16 comprising stanza 20 and UPnP DCPs 22 may be generated. At 106, data 16 may be transmitted in an XML stream (e.g., XML stream 78) to second UPnP entity 12(2) in second UPnP network 14(2) via XMPP server 18 in third network 14(3).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, UPnP entity 12. In some embodiments, one or more of these features may be implemented in hardware, provided external to these elements, or consolidated in any appropriate manner to achieve the intended functionality. The various network elements (e.g., UPnP entity 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, UPnP entity 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 32) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 30) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
mapping, at a first Universal Plug and Play (UPnP) entity in a first UPnP network by a mapping module provisioned in the first UPnP entity, a first content formatted according to UPnP device architecture (UDA) protocols to at least one stanza formatted according to Extensible Messaging and Presence Protocol (XMPP);
generating, by a data generator module provisioned in the first UPnP entity, data comprising the at least one XMPP stanza and a second content formatted according to UPnP device control protocols (DCPs), wherein the second content comprises device-specific information related to the first UPnP entity; and
transmitting the data in an Extensible Markup Language (XML) stream over an XMPP network from the first UPnP entity to a second UPnP entity in a second, remote UPnP network.

2. The method of claim 1, wherein the first content includes discovery information according to Simple Service Discovery Protocol (SSDP), wherein a portion of the discovery information is mapped to an appropriate<presence/>stanza according to XMPP.

3. The method of claim 2, wherein the discovery information includes UPnP device descriptions and service descriptions, wherein the UPnP device descriptions and service descriptions are referenced in a roster stanza according to XMPP.

4. The method of claim 2, wherein the first UPnP entity and the second UPnP entity log into the XMPP network as respective XMPP clients, wherein each XMPP client represents at least one UPnP entity.

5. The method of claim 1, wherein the first content includes control information according to Simple Object Access Protocol (SOAP), wherein the control information according to SOAP is mapped to a SOAP stanza according to XMPP.

6. The method of claim 5, wherein the control information comprises actions specified in service descriptions of the first UPnP entity and the second UPnP entity, wherein each action according to SOAP is replaced by at least a first XMPP notification and a second XMPP notification, wherein the first XMPP notification invokes the action and the second XMPP notification relays a response.

7. The method of claim 1, wherein the first content comprises event information according to General Event Notification Architecture (GENA) protocol, wherein the event information is mapped to a GENA stanza comprising at least one appropriate<iq/>stanza according to XMPP.

8. The method of claim 7, wherein the<iq/>stanza embeds a subscription message in GENA protocol of the first UPnP entity to receive event data, wherein hyper-text transfer protocol (HTTP) headers according to GENA protocol are reformatted as XML according to XMPP.

9. The method of claim 1, wherein the second content includes vendor specific information conveyed in appropriate device descriptions and service descriptions.

10. The method of claim 1, wherein the second content formatted according to UPnP DCPs is reused in the data without modification from UPnP DCP specifications.

11. Non-transitory tangible media that includes instructions for execution, which when executed by a processor of a first UPnP entity in a first UPnP network, is operable to perform operations comprising:
mapping, at the first UPnP device by a mapping module provisioned in the first UPnP entity, a first content formatted according to UDA protocols to at least one stanza formatted according to XMPP;
generating, by a data generator module provisioned in the first UPnP entity, data comprising the at least one XMPP stanza and a second content formatted according to UPnP DCPs, wherein the second content comprises device-specific information related to the first UPnP entity; and
transmitting the data in an XML stream over an XMPP network from the first UPnP entity to a second UPnP entity in a second, remote UPnP network.

12. The media of claim 11, wherein the first content includes discovery information according to SSDP, wherein a portion of the discovery information is mapped to an appropriate<presence/>stanza according to XMPP.

13. The media of claim 11, wherein the first content includes control information according to SOAP, wherein the control information according to SOAP is mapped to a SOAP stanza according to XMPP.

14. The media of claim 11, wherein the first content comprises event information according to GENA protocol, wherein the event information is mapped to at least one appropriate<iq/>stanza according to XMPP.

15. The media of claim 11, wherein the second content includes vendor specific information conveyed in appropriate device descriptions and service descriptions.

16. An apparatus, comprising:

a mapping module;

a data generator module;

a memory element for storing data; and a processor, wherein the processor executes instructions associated with the data, wherein the processor and the memory element cooperate, such that the apparatus is configured as a first UPnP device in a first UPnP network for:

mapping, by the mapping module, a first content formatted according to UDA protocols to at least one stanza formatted according to XMPP;

generating, by the data generator module, data comprising the at least one XMPP stanza and a second content formatted according to UPnP DCPs, wherein the second content comprises device-specific information related to the first UPnP entity; and transmitting the data in an XML stream over an XMPP network from the first UPnP entity to a second UPnP entity in a second, remote UPnP network.

17. The apparatus of claim 16, wherein the first content includes discovery information according to SSDP, wherein a portion of the discovery information is mapped to an appropriate<presence/>stanza according to XMPP.

18. The apparatus of claim 16, wherein the first content includes control information according to SOAP, wherein the control information according to SOAP is mapped to a SOAP stanza according to XMPP.

19. The apparatus of claim 16, wherein the first content comprises event information according to GENA protocol, wherein the event information is mapped to at least one appropriate<iq/>stanza according to XMPP.

20. The apparatus of claim 16, wherein the second content includes vendor specific information conveyed in appropriate device descriptions and service descriptions.

* * * * *